Oct. 4, 1927.
J. MARKMAN
1,644,260
AUTOMATIC WEIGHING MACHINE
Filed Sept. 29, 1925        3 Sheets-Sheet 1
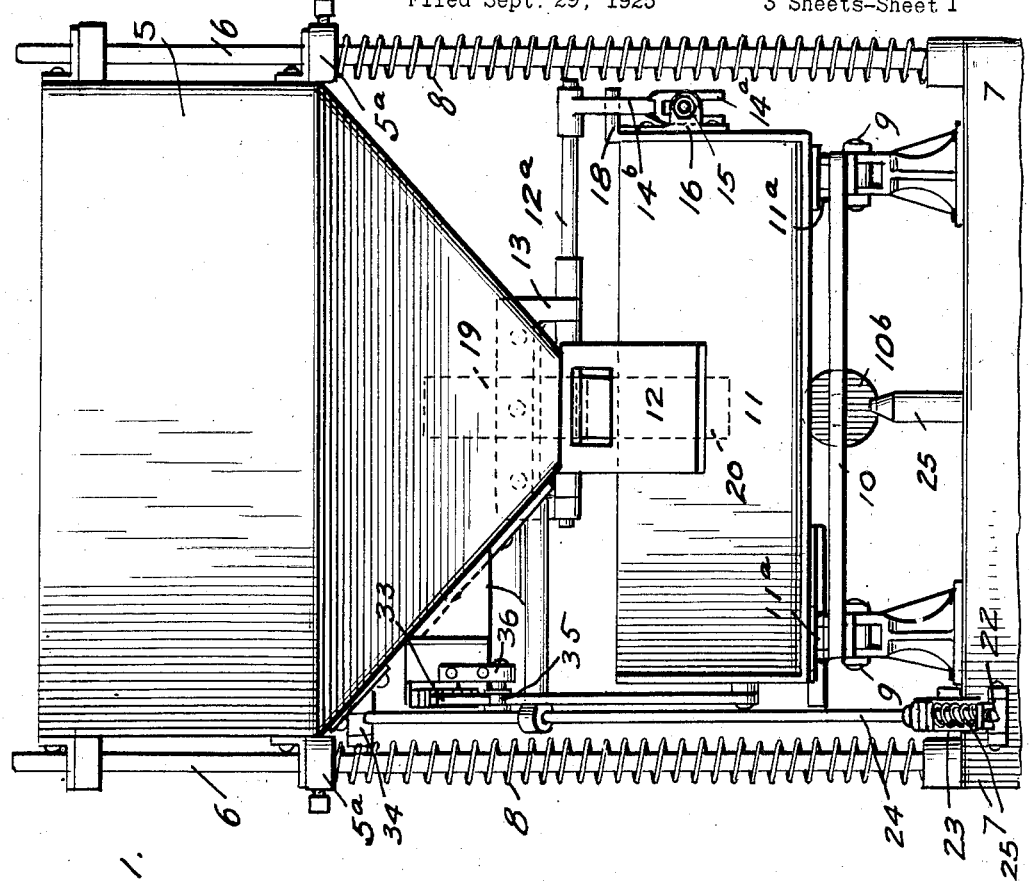
Inventor
JOHN MARKMAN
By Milo B. Stevens
Attorneys

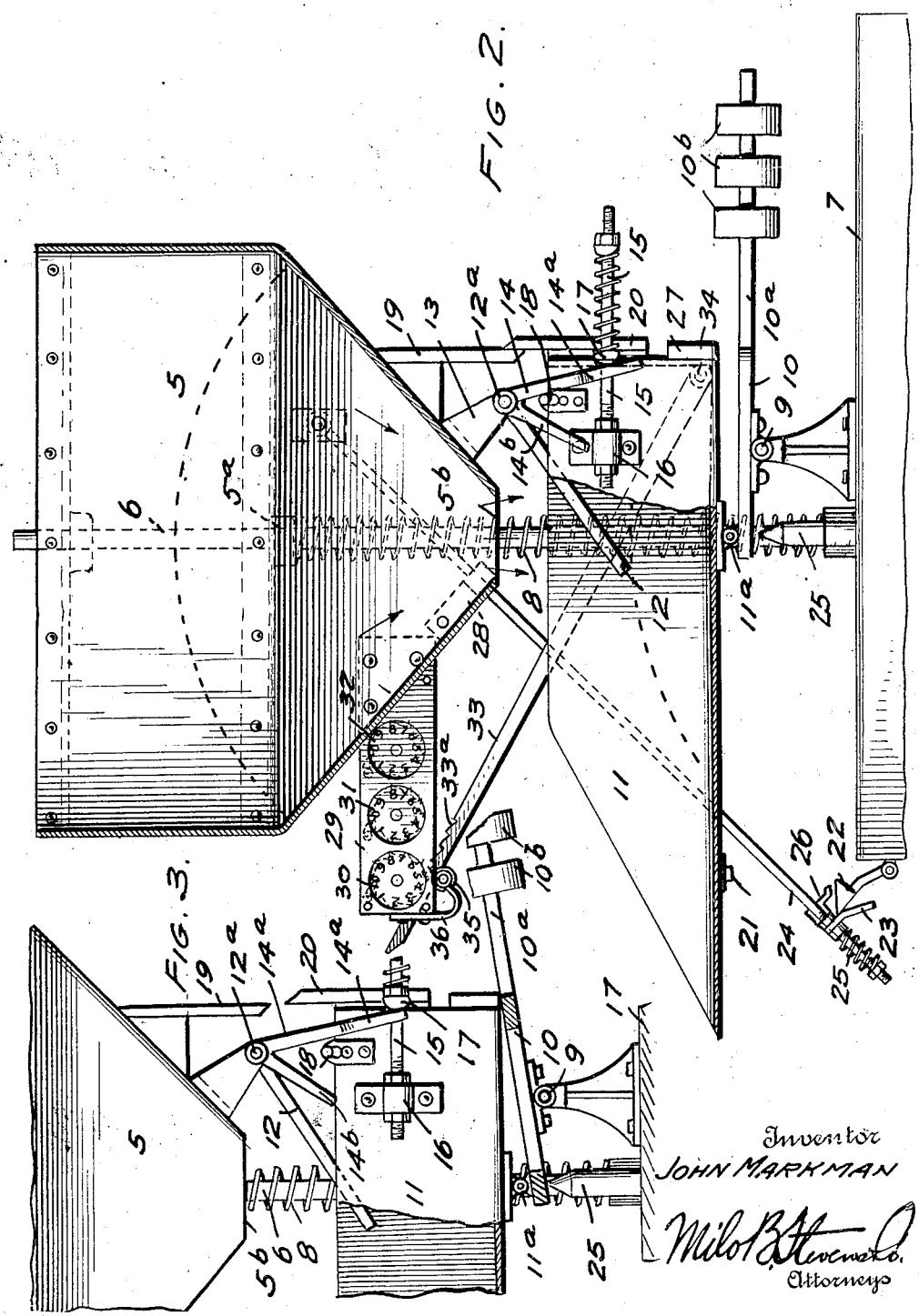

Oct. 4, 1927.  
J. MARKMAN  
1,644,260  
AUTOMATIC WEIGHING MACHINE  
Filed Sept. 29, 1925  
3 Sheets-Sheet 3
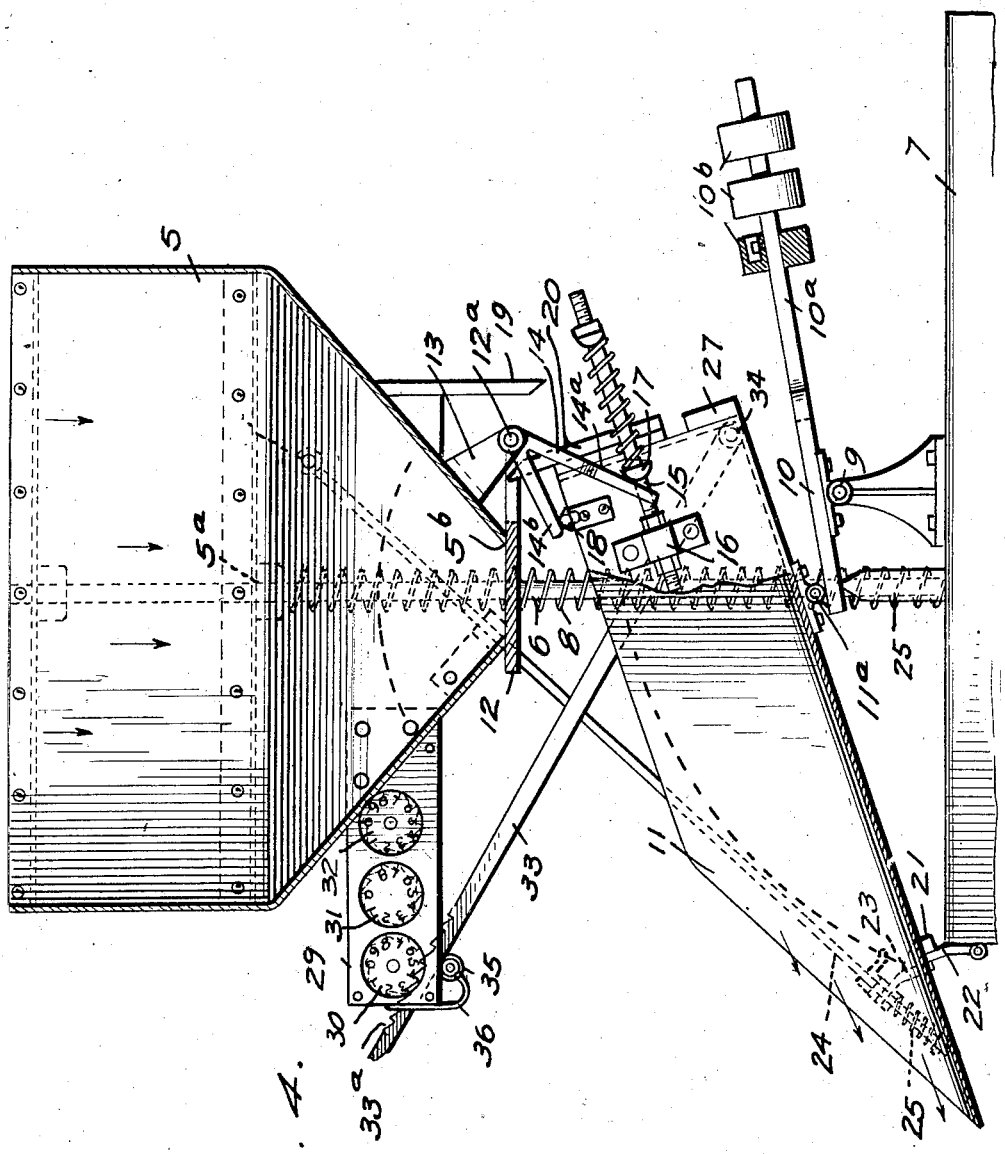
Inventor  
JOHN MARKMAN Patented Oct. 4, 1927.

1,644,260

UNITED STATES PATENT OFFICE.

JOHN MARKMAN, OF FORRESTON, ILLINOIS.

AUTOMATIC WEIGHING MACHINE.

Application filed September 29, 1925. Serial No. 59,405.

My invention relates to automatic weighing devices and particularly to such as are designed for handling material such as coal, sand, gravel, etc.

The invention contemplates a device of this character which will be of relatively simple and exceedingly durable construction and highly efficient in operation.

The preferred embodiment of the invention which has been illustrated in the drawings comprehends a spring supported material receiving hopper mounted on a base and a tiltable weighing and discharge hopper or receptacle disposed therebeneath and mounted upon one end of a pivoted scale arm, the other end of which is designed to receive weights. Interengaging projections carried by the material receiving hopper and the weighing receptacle serve to prevent the latter from tilting and discharging while being filled. When sufficient material has passed from the receiving hopper into the weighing receptacle to balance the weights on the other end of the scale arm the said interengaging portions are freed thus permitting the weighing receptacle to tilt and to discharge its contents. The tilting of the weighing receptacle to discharge position serves to actuate the door of the receiving hopper to closed position and to so maintain it while the discharge of material is in progress. In order to maintain the weighing receptacle in discharge position for a period sufficient to assure of the complete discharge of its contents I have provided an arm which comprises an arm fixed to one side of the receiving receptacle this arm having a controlling engagement with a latch member which is carried by the base and which is designed to engage a hook upon the bottom of the weighing receptacle. As a new supply of material is being accumulated in the receiving hopper it begins to sag on its supporting springs. This actuates the latch controlling arm to disengage the latch from the weighing receptacle which is now permitted to tilt rearwardly to its material receiving position. The rearward tilting movement of the weighing receptacle is caused by a weight fastened to the back thereof. The return of the weighing receptacle to its material receiving position actuates the door of the receiving hopper to its open position and material is now free to fall into the weighing receptacle.

In order to keep track of the quantity of material which has been dispensed I have provided a ratchet operated counter or indicator comprising a plurality of intergeared disks much after the fashion of those used in gas meters. One disk indicates units another tens and another hundreds, etc. The unit disk has ratchet teeth and is operated each time the weighing receptacle tilts by means of a ratchet bar pivoted to the rear end of the weighing receptacle.

Referring specifically to the drawings, Figure 1 is a front elevation of my machine with the weighing receptacle in charging position;

Figure 2 is a vertical sectional view;

Figure 3 is a detail view in side elevation and partly in section showing the relative position of the receiving hopper and the weighing receptacle just before the latter tilts to discharge position, and Figure 4 is a vertical sectional view through the machine and illustrating the weighing receptacle in its discharge position.

Referring specifically to the drawings, the receiving hopper is denoted at 5, and is slidingly supported upon posts 6 rising from a base 7. Coiled springs 8 surround the posts and engage the ears $5^a$ of the hopper whereby to yieldingly support the same.

Pivotally mounted upon the base as indicated at 9 is a scale member 10 one end being formed with an arm $10^a$ for receiving removable weights $10^b$. The portion of the scale member 10 on the other side of the pivot 9 supports a weighing receptacle 11 which is pivotally mounted upon the scale arm 10 as indicated at $11^a$. The door 12 which is operable to close the outlet $5^b$ of the receiving hopper is fixed to a shaft $12^a$ carried by brackets 13 which are fixed to the outer wall of the hopper. The shaft $12^a$ has at one end a bell-crank lever 14 having a bifurcated arm $14^a$ which straddles a pin 15 adjustably carried in a cleat 16 fixed to one side of the weighing receptacle 11. A spring pressed abutment or washer 17 which is slidably mounted on the pin 15 is in normal engagement with the bifurcated arm $14^a$. Upon reference to Figure 3 it will be evident that when the weighing receptacle rocks downwardly to discharge position the abutment 17 will actuate the bifurcated arm $14^a$ so as to swing the door 12 to its closed position. As a means for further assuring the closing of the door especially if there remains a considerable quantity of material in the hopper 5, I have provided a lug 18 projecting from the side of the weighing receptacle which lug after a partial movement of the receptacle to its discharge position comes to bear against the other bellcrank lever arm 14ᵇ. The door 12 will thus be positively closed due to the weight of material in the weighing receptacle 11 which will counteract the weight of such material as may be in the hopper 5. It is also to be noted that lug 18, as shown in Fig. 2, engages bifurcated arm 14ᵃ whereby to hold the door 12 open against the action of the spring pressed abutment 17.

So far as the description has proceeded it will be understood that the initial position of the parts is as disclosed in Figure 2. They remain in this position until there is sufficient weight of material in the weighing receptacle 11 to counterbalance the weights 10ᵇ. As the weighing receptacle 11 becomes filled the scale arm 10 tilts and the weighing receptacle 11 sags downwardly in plane parallel with the base 7. This parallelism is maintained until the exact predetermined weight of material is deposited into the weighing receptacle by means of slidably interengaging metal straps 19 and 20 which are carried respectively by the hopper 5 and the weighing receptacle 11. Figure 2 clearly shows how the strap 20 bears against the outer surface of the strap 19 to prevent forward tilting of the weighing receptacle during the filling thereof while Figure 3 shows the relative position of the straps immediately after they have become disengaged and just before the weighing receptacle tilts to discharge position. Figure 4 illustrates the complete disengagement of the straps and the receptacle tilted.

The weighing receptacle at the instant it reaches the limit of its tilting movement has its angular projection 21 which is carried at the bottom thereof come into engagement with the hook 22 pivoted to the end of the base member 7. The hook 22 is backed by a lug 23 which is slidably carried by a rod 24 and backed by a coil spring 25 which encircles the rod. This rod 24 is fixedly carried at one side of the hopper 5 and when the hopper 5 is forced upwardly slightly by its supporting springs 8 it will be evident that the hook 22 will be positively held in engagement with the part 21 which is on the bottom of the weighing receptacle 11.

In order to prevent excessive and unnecessary tilting of the scale bar 10 I have provided a post 25 which is carried by the base and against which the scale bar comes to rest. As previously indicated the hopper 5 will be forced upwardly slightly by its springs 8 immediately its load has been deposited in the weighing receptacle 11 and the latter actuated to discharging position.

When the material in the weighing receptacle has been discharged and a quantity of material dumped into the hopper 5 the latter will naturally sag on its springs 8 and this sagging movement will move the lug 23 to permit the hook or latch 22 to disengage itself from the part 21. However, in order to assure a positive engagement of the parts 21 and 22 I have provided on the rod 24 a stop 26 which when the weighing receptacle sags as aforesaid will engage the nose of the hook 22 and positively move the same away from the part 21. The parts 21 and 22 being disengaged the weights 10ᵇ will be free to move the weighing receptacle upwardly and will permit a weight 27 which is carried back of the weighing receptacle to tilt the same to a horizontal position. It is to be understood that the straps 19 and 20 will in nowise prevent the weighing receptacle from assuming a position horizontal to the base 7 for the reason that but a slight movement of the rod 24 is necessary to disengage the hook 22 and the movement of the hopper 5 which is sufficient to accomplish this end will not bring the strap 19 into the path of the weighing receptacle carried strap 20. During the movement of the weighing receptacle 11 from discharging to receiving position the spring pressed abutment holds the door 12 closed until lug 18 engages arm 14ᵃ to swing it open. When this occurs the receptacle will be substantially in receiving position.

In order that the operator of the machine may conveniently keep tab on the quantity of material which he has dispensed over a given period I have provided a counter-mechanism to which I shall now make reference. It comprises a casing 29 which is fixedly carried by the hopper 5 and within which are mounted rotatable intergeared indicating disks 30, 31, and 32. These will not be described in detail as the construction is old and well known, it sufficing to say that the disk 30 indicates units, the second disk tens and the third hundreds. The disk 30 has ratchet teeth which are designed to be engaged by the ratchet teeth 33ᵃ of a rod 33 which is pivoted at 34 to the rear portion of one side of the weighing receptacle 11. The ratchet teeth 33ᵃ are maintained in engagement with the ratchet teeth of the gear 30 by means of a flanged roller 35 which is suitably journaled in a curved bracket 36 which is fastened to the outer end of the housing 29. As the weighing receptacle 11 tilts to its discharge position the disk 30 has imparted thereto a movement equivalent to one of its graduations. When the weighing receptacle 11 has been actuated a sufficient number of times to cause the disk 30 to make one complete revolution the disk 31 will be moved one graduation in a well known manner.

I am aware that many changes may be made from the illustrated embodiment of the device without a departure from the spirit and scope of the invention as claimed. For instance it is obvious that I may use any acceptable form of weighing device as a mount for the weighing receptacle 11.

I claim as my invention:

1. In an automatic weighing machine, the combination of a weighing receptacle, a yieldingly supported hopper designed to discharge into said weighing receptacle, the latter being movable to discharge its contents, a latch for maintaining said weighing receptacle in discharge position, a releasing means for said latch controlled by said hopper upon deposit of a supply of material therein.

2. In an automatic weighing machine, the combination of a weighing receptacle having discharge means operable upon deposit of a predetermined weight of material therein, a yieldingly supported hopper designed to discharge into said weighing receptacle, means acting to maintain said discharge means in effective position, and hopper controlled means for releasing said last mentioned means.

3. An automatic weighing machine comprising a yieldingly supported hopper having an outlet opening, a closure for said opening, a pivotally mounted scale bar supported weighing receptacle into which said hopper discharges, interengaging members carried by said hopper and weighing receptacle and releasable upon the deposit of a predetermined weight of material in said receptacle to allow the latter to tilt to discharge position, latch means for holding said weighing receptacle in discharge position, and releasing means for said latch actuated by said hopper upon the deposit of a supply of material therein.

4. An automatic weighing machine comprising a hopper having a discharge opening, a swingingly mounted door for said opening, a weighing device including a pivotally mounted weighing receptacle designed to tilt to a discharge position on deposit of a predetermined weight of material therein, a bell crank lever carried by said hopper and designed to control the movements of said door, yielding means carried by said weighing receptacle and normally bearing against one arm of said bell crank lever to tend to maintain said door in closed position, fixed means acting upon said arm when said weighing receptacle is in normal position for maintaining said door open, said fixed means upon tilting of said weighing receptacle to discharge position engaging the other arm of said bell crank lever and cooperating with said yielding means for holding said door closed.

5. In an automatic weighing machine, a hopper having a discharge outlet and a closure therefor, a weighing receptacle into which said hopper discharges, actuating means for said closure effective on movement of said weighing receptacle, said actuating means comprising yielding means normally tending to hold said door closed, and means effective in one position of said weighing receptacle to hold said door open and effective in another position of said weighing receptacle to hold said door closed.

6. In an automatic weighing machine, a hopper having a discharge outlet and a door therefor, a weighing receptacle tiltable to discharge position on receipt of a predetermined weight of material, yielding means normally tending to close said door, and means carried by said weighing receptacle and acting against said yielding means for holding said hopper door open when the weighing receptacle is in material receiving position.

7. In an automatic weighing machine, a hopper having a discharge outlet and a door therefor, a weighing receptacle tiltable to discharge position on receipt of a predetermined weight of material, yielding means normally tending to close said door, and means carried by said weighing receptacle and acting against said yielding means for holding said hopper door open when the weighing receptacle is in material receiving position, said second-mentioned means upon movement of said weighing receptacle to discharging position cooperating with said yielding means for holding said door closed.

8. In an automatic weighing machine, a hopper having a discharge outlet and a closure therefor, a weighing receptacle into which said hopper discharges, actuating means for said closure effective on movement of said weighing receptacle, said actuating means comprising yielding means carried by said weighing receptacle and normally tending to hold said door closed, and means effective in one position of said weighing receptacle to hold said door open and effective in another position of said weighing receptacle to hold said door closed.

9. In an automatic weighing machine, a hopper having a discharge outlet and a closure therefor, a weighing receptacle into which said hopper discharges, actuating means for said closure effective on movement of said weighing receptacle, said actuating means comprising yielding means carried by said weighing receptacle and normally tending to hold said door closed, and means carried by the weighing receptacle and effective in one position of said weighing receptacle to hold said door open and effective in another position of said weighing receptacle to hold said door closed.

10. In an automatic weighing machine, a hopper having a discharge outlet and a closure therefor, a weighing receptacle into which said hopper discharges, crank means for actuating said closure, yielding means carried by said weighing receptacle and engaging said crank means for normally holding said closure closed, and fixed means carried by said weighing receptacle and engaging said crank means to hold said closure open when said weighing receptacle is in material receiving position.

11. In an automatic weighing machine, a hopper having a discharge outlet and a closure therefor, a weighing receptacle into which said hopper discharges, crank means for actuating said closure, yielding means carried by said weighing receptacle and engaging said crank means for normally holding said closure closed, fixed means carried by said weighing receptacle and engaging said crank means to hold said closure open when said weighing receptacle is in material receiving position, and said fixed means cooperating with said yielding means to hold said closure in closed position when said weighing receptacle is in material discharging position.

12. In an automatic weighing machine, a hopper having a discharge outlet and a door therefor, a weighing receptacle tiltable to discharge position on receipt of a predetermined weight of material, a crank member for operating said door and comprising spaced parts, yielding means carried by said weighing receptacle and engaging one of said parts to normally tend to hold said door in closed position, a fixed element carried by said weighing receptacle and interposed between said crank parts, said fixed element when the weighing receptacle is in material receiving position engaging said aforementioned crank part to hold the door open against the action of said yielding means, and said fixed element when said weighing receptacle is in discharging position engaging the other crank part to cooperate with said yielding means to hold said door closed.

13. The construction defined in claim 12, said yielding means comprising a coil spring, a guide rod carried by said weighing receptacle on which said spring is adjustably mounted, and said first mentioned crank part being bifurcated to straddle said rod.

In testimony whereof I affix my signature.

JOHN MARKMAN.